United States Patent [19]
Lukes et al.

[11] 3,945,880
[45] Mar. 23, 1976

[54] SODIUM CHLORIDE REMOVAL IN PULP MILL SYSTEMS

[75] Inventors: Jerome A. Lukes, Ogden; Robert P. Schroeder, Salt Lake City, both of Utah

[73] Assignee: Erco Envirotech Ltd., Islington, Canada

[22] Filed: Aug. 5, 1974

[21] Appl. No.: 494,897

[52] U.S. Cl. ................... 162/17; 23/302 T; 162/19; 162/30 K; 162/89; 162/DIG. 8; 423/207; 423/499
[51] Int. Cl.² ..................... D21C 3/02; D21C 11/04
[58] Field of Search ............. 162/17, 29, 30, 36, 88, 162/89, DIG. 8, 19; 423/183, 184, 207, 421, 499, 205, 208; 23/297, 299, 302, 303

[56] References Cited
UNITED STATES PATENTS

| | | | |
|---|---|---|---|
| 1,791,281 | 2/1931 | Morse | 423/184 X |
| 2,642,399 | 6/1953 | Aries et al. | 252/183 |
| 2,862,887 | 12/1958 | Boyer | 252/183 |
| 3,560,329 | 2/1971 | Nelson et al. | 162/30 |
| 3,698,995 | 10/1972 | Rapson | 162/DIG. 8 |
| 3,746,612 | 7/1973 | Rapson et al. | 162/30 |
| 3,755,068 | 8/1973 | Rapson | 162/30 |
| 3,909,344 | 9/1975 | Lukes | 162/17 |

FOREIGN PATENTS OR APPLICATIONS

| | | | |
|---|---|---|---|
| 2,159,935 | 6/1973 | France | 162/DIG. 8 |
| 928,008 | 6/1973 | Canada | 162/DIG. 8 |

*Primary Examiner*—S. Leon Bashore
*Assistant Examiner*—Peter F. Kratz
*Attorney, Agent, or Firm*—Shoemaker and Mattare

[57] ABSTRACT

Smelts produced in Kraft mill and soda mill spent pulping liquor recovery operations and containing sodium chloride are treated to remove sodium chloride therefrom in pure form while the removal of usable components is avoided. A solid mixture of sodium chloride, sodium carbonate and sodium sulphate is provided in the case of the soda mill, or first is separated from the sodium sulphide in the case of the Kraft mill. Thereafter, the solid mixture is leached to remove the sodium carbonate and sodium sulphate while leaving the sodium chloride in a substantially pure form, the resulting leach liquor being refrigerated to deposit sodium carbonate and sodium sulphate. The mother liquor, after removal of the deposited salts is recycled to the solid mixture leaching step.

24 Claims, 3 Drawing Figures

SODIUM CHLORIDE REMOVAL IN PULP MILL SYSTEMS

FIELD OF INVENTION

This invention is directed to the removal of sodium chloride from pulp mill systems.

BACKGROUND TO THE INVENTION

In a liquid-effluent-free pulp mill, bleach plant effluent, containing sodium chloride values from chlorine-containing spent bleaching chemicals, typically chlorine, chlorine dioxide, chlorine monoxide and sodium hypochlorite, and soda values from spent caustic extraction chemicals, typically sodium hydroxide, used in the bleaching and purification procedures of the bleach plant, is discharged to the spent pulping liquor recovery and regeneration operation of the pulping process producing the pulp for bleaching and purification.

Typically such recovery and regeneration operation includes burning the liquors to remove carbonaceous materials and to form a mixture of chemicals reusable as or convertible into pulping chemicals for recycle. Since sodium chloride is unaffected chemically by the recovery and regeneration operation, it would remain as a dead load in the effluent-free pulp mill and build up in the system unless steps are taken to remove the same.

The effluent-free pulp mill may be used with the Kraft mill process, wherein the active pulping chemicals are sodium hydroxide and sodium sulphide. Sodium sulphate or other sodium-and sulphur-chemical is added to the spent pulping liquor to make up losses of sodium and sulphur from the system. The recovery and regeneration operation produces a smelt in the burning or furnacing step which contains mainly sodium sulphide and sodium carbonate which later is converted to sodium hydroxide, together with small amounts of sodium sulphate and other sodium sulphur-oxygen compounds. The smelt also contains sodium chloride in the effluent-free mill procedure.

The present invention is directed to the removal of sodium chloride in pure form from the smelt without removing the usable chemicals. Canadian Pat. No. 928,008 describes a procedure for the removal of sodium chloride from a sodium sulphide-, sodium carbonate- and sodium chloride-containing smelt involving first leaching sodium sulphide from the smelt at a temperature above 50°C followed by separation of sodium chloride from the sodium sulphide-free smelt at a temperature below 20°C.

Problems exist with this procedure. Thus, under the conditions of operation, the sodium chloride is obtained as an aqueous solution thereof which also contains some dissolved sodium carbonate. This prior art suggests discarding the sodium chloride solution, thereby discarding some of the valuable sodium carbonate.

The present invention seeks to overcome this problem of the art by recovering the sodium chloride in a solid substantially pure form and avoiding the discarding of sodium carbonate values from the system.

The principles of this invention are applicable to other pulp mill operations in addition to the Kraft mill process which utilize sodium sulphide or in which aqueous sodium sulphide is produced as an intermediate product. Typical of such additional processes are high yield pretreatment Kraft, polysulphide, alkafide and sodium-based sulphite processes.

The effluent-free pulp mill also may be used in a soda mill where sodium hydroxide is used as the active pulping chemical. The furnacing in the recovery and regeneration operation results in a smelt which contains sodium carbonate and sodium chloride.

The smelt also usually contains small quantities of sodium sulphate and other sodium- and sulphur-oxygen salts arising from the furnace fuel oil, the wood and from sodium sulphate-contaminated make-up chemicals.

The present invention is also directed to the recovery of sodium chloride in substantially pure solid form without loss of usable chemicals from the sodium carbonate-, sodium chloride- and sodium sulphate-containing smelt of a soda mill.

While the present invention will be described more particularly with reference to the presence of sodium chloride in the smelt arising from bleach plant effluents, the sodium chloride may arise from other sources, singly or in combination, such as sodium chloride in the wood chips from which the pulp is formed, arising from the floating of logs or sea water, sodium chloride contamination in pulp mill chemicals and sodium chloride contamination in water utilized in the pulp mill.

SUMMARY OF INVENTION

In accordance with the present invention, a solid mixture of sodium carbonate, sodium chloride and sodium sulphate is formed as, or separated from, the smelt formed in a pulp mill recovery operation wherein sodium chloride is introduced from at least one source thereof, is leached to dissolve the sodium carbonate and sodium sulphate values therefrom and thereby leave substantially pure sodium chloride which is recovered. The leach liquor subsequently is refrigerated to deposit sodium carbonate and sodium sulphate therefrom and the mother liquor is recycled to the solid mixture leaching step. The sodium carbonate values of the deposited mixture with sodium sulphate are causticized to sodium hydroxide, which is recycled to the pulping liquor.

The quantity of sodium chloride present in the solid mixture subjected to leaching depends on the source of the sodium chloride. Typically, the bulk thereof is provided by bleach plant effluent where a liquid-effluent-free mill is used and the quantity depends on the bleaching sequence employed. In a typical procedure where a mixture of chlorine dioxide and chlorine are utilized in the first stage of a CEDED sequence the quantity of sodium chloride may vary between about 120 and 160 lbs/ton of pulp, depending on the proportion of chlorine dioxide used.

Where the invention is carried out on a sodium sulphide-containing smelt, the smelt first is fractionated to separate the sodium sulphide values from the solid mixture of sodium carbonate, sodium chloride and sodium sulphate.

The manner of achieving the fractionation of the smelt is not critical to this invention. In one embodiment, the smelt may be leached to remove therefrom substantially all the sodium sulphide values and leave a solid mixture consisting substantially of sodium carbonate, sodium chloride and sodium sulphate. The resulting aqueous sodium sulphide solution containing some dissolved sodium carbonate, sodium chloride and sodium sulphate values of the smelt is recycled to provide at least one of the pulping chemicals.

As an alternative, the smelt may be dissolved in aqueous material to provide an aqueous solution of the components. The resulting aqueous solution is concentrated, typically by boiling, to deposit a mixture of sodium carbonate, sodium chloride and sodium sulphate. The deposited mixture is removed for manipulation in accordance with this invention and the sodium sulphide solution is recycled to the pulping step.

DESCRIPTION OF PREFERRED EMBODIMENT

Figure 1:
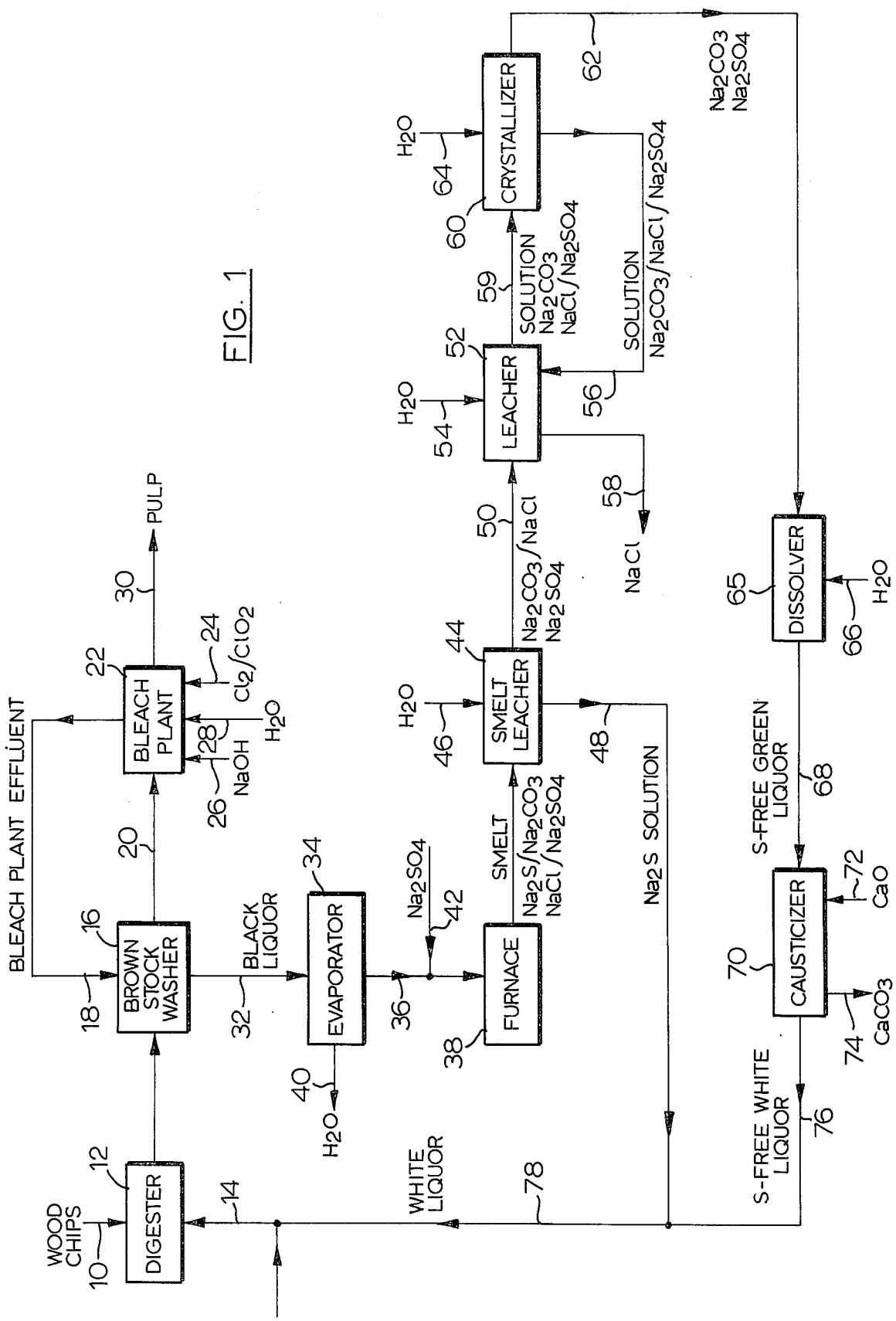
FIG. 1 is a schematic flow sheet of one embodiment of the invention.

Referring to the drawing, wood chips, or other raw cellulosic fibrous material, are fed by line 10 to a digester 12 wherein the wood chips are digested with a pulping liquor fed by line 14 and containing sodium sulphide and sodium hydroxide as the active pulping chemicals, and hence utilizing the Kraft process.

The resulting pulp and black liquor are separated and the pulp is washed in a brown stock washer 16. The pulp is washed, in the embodiment illustrated, with aqueous bleach plant effluent fed by line 18. Alternatively, the pulp may be washed with water or "contaminated condensate", and the bleach plant effluent may be utilized elsewhere in the system. In order to avoid the formation of hydrogen sulphide during this washing step when the bleach plant effluent is used, it is preferred to provide the bleach plant effluent at neutral or slightly alkaline pH, typically around pH 9.

The washed and unbleached pulp is fed by line 20 to a bleach plant 22 wherein the pulp is subjected to a series of bleaching and purification processes involving the use of one or more chlorine-containing bleaching agents. Generally, the bleaching and purification processes involve bleaching with chlorine, chlorine dioxide or mixtures thereof fed by line 24 and purification by caustic extraction, using aqueous sodium hydroxide solution fed by line 26, typically in a CEDED sequence. The pulp is washed during the bleach plant operations, typically after each bleaching or caustic extraction operation, by water fed by line 28. The spent wash water from the bleach plant washing operations together with the spent chemicals from the bleaching and caustic extraction steps provide the bleach plant effluent in line 18.

Preferably, the washing operations involve countercurrent flow of pulp and wash water through the bleach plant. Preferably, the quantity of sodium hydroxide used in the caustic extraction of the pulp is slightly in excess of the stoichiometric requirement of one sodium atom for each chlorine atom in the bleaching chemicals, whereby the bleach plant effluent in line 18 has an alkaline pH, as mentioned above. The bleached and purified pulp of required brightness is recovered from the bleach plant 22 by line 30 and is passed to paper making procedures.

If desired, the bleach plant effluent in line 18 may be added directly to the black liquor in line 32, although this procedure is less preferred, since the overall water requirement thereby is increased.

The bleach plant effluent in line 18 contains considerable quantities of sodium chloride which are transferred to the black liquor in line 32. The black liquor is evaporated in an evaporator 34 prior to passage by line 36 to a furnace 38 of any convenient construction. The water recovered from the evaporator 34 by line 40 may be used to provide at least part of the water requirement of the system, for example, as at least part of the water fed to the bleach plant in line 28, after suitable cleaning, if required.

Sodium sulphate, or other source of sodium-and sulphur-values, such as spent acid, is added to the black liquor in the furnace 36, typically by addition by line 42 to the evaporated liquor in line 36. The sodium sulphate, which may be added in solid, slurry or aqueous solution form, is used to make up the sodium and sulphur values lost from the system in the chemical recovery and regeneration processing steps.

The black liquor forms in the furnace 38 a smelt containing sodium sulphide and sodium carbonate, and additionally unreacted components, consisting of sodium chloride and sodium sulphate and other sodium sulphur-oxygen salts.

Thus, there is obtained from the furnacing operation a smelt containing sodium sulphide, sodium carbonate, sodium chloride and sodium sulphate. This smelt is subjected to various operations in accordance with the invention to remove sodium chloride.

The smelt first is leached at an elevated temperature in a smelt leacher 44 by water fed by line 46 to dissolve substantially all the sodium sulphide values from the smelt. The water used in line 46 may be constituted by "weak wash" water from the washing of calcium carbonate mud following causticization.

The resulting sodium sulphide solution in line 48 usually contains some dissolved sodium carbonate, sodium sulphate and sodium chloride values but the bulk thereof remains as undissolved solids which are passed by line 50 to a leacher 52. The sodium sulphide solution in line 48, after dilution, if desired, is used to form recycle pulping liquor, as described in more detail below.

The smelt leaching step is carried out at an elevated temperature, typically from 120°F to the boiling point of the solution. The quantity of water used in the smelt leaching is maintained at a level to produce a high concentration of sodium sulphide in the sodium sulphide solution of line 48, in order to inhibit the dissolving of large quantities of sodium chloride in the sodium sulphide solution. Typically, the sodium sulphide concentration is in the range of about 20 to about 45%.

While two separate leachers 44 and 52 are illustrated, this is for the sake of convenience in ease of illustration. A single leacher may be used, if desired, the leaching steps being carried out sequentially.

In the leacher 52, the solid mixture is contacted by water fed by line 54 and recycle aqueous solution in line 56 to dissolve substantially completely the sodium carbonate and sodium sulphate from the solid mixture, leaving substantially pure sodium chloride, which is recovered by line 58.

The leaching of the mixture in the leacher 52 may be carried out at approximately ambient temperatures, typically from about 55° to about 90°F, particularly about 70°F, which represents the temperature of approximately maximum solubility of sodium carbonate and sodium sulphate in the system $Na_2CO_3$ — $Na_2SO_4$ — NaCl — H₂O.

The solution resulting from the solid mixture leaching in leacher 52, containing some recycling sodium chloride in addition to the sodium carbonate and sodium sulphate, is passed by line 59 to a crystallizer 60. In the crystallizer, the aqueous solution is refrigerated to cause deposition of a mixture of sodium carbonate and sodium sulphate free from sodium chloride, the deposited mixture being removed from the mother liquor by line 62.

Water usually is added during the refrigeration step since, at the prevailing temperature, the sodium carbonate precipitates as the decahydrate, such water being added by line 64.

The refrigeration of the solution in the crystallizer 60 may be carried out in any convenient manner, typically to a temperature below 60°F, such as from about 32°F to 60°F, preferably about 50°F.

The lower limit of this temperature range compares favourably with the temperature range specified in the aforementioned Canadian Pat. No. 928,008, wherein temperatures down to −20°C are used, considerably increasing the energy requirements, as compared to the procedure of this invention.

The mother liquor from the crystallization of sodium carbonate and sodium sulphate is recycled by line 56 to the leacher 52 for utilization therein.

In a balanced system, the quantities of sodium chloride, sodium carbonate and sodium sulphate recylcing in line 56 are substantially constant, so that the quantity of sodium carbonate and sodium sulphate in line 62 is substantially that in line 50 and the quantity of sodium chloride in line 58 is substantially that in line 50.

The mixture of sodium carbonate and sodium sulphate in line 62 fed to the dissolver 65 is dissolved in water fed by line 66 to form sulphide-free green liquor which passes by line 68 to a causticizer 70 wherein a substantial proportion of the sodium carbonate values are converted to sodium hydroxide by lime fed to the causticizer 70 through line 72. The calcium carbonate mud precipitated in the causticizer 70 is separated from the resulting sulphide-free white liquor and is forwarded by the line 74 to a lime kiln for formation of further amounts of lime.

The calcium carbonate mud is washed with water to remove entrained amounts of white liquor prior to passage to the lime kiln. The spent wash water from the latter washing is the weak wash used preferably to dissolve the smelt in the smelt leacher 44 as part of the water requirement in line 46.

The sulphide-free white liquor, consisting of an aqueous solution of sodium hydroxide containing sodium sulphate and uncausticized sodium carbonate, is passed by line 76 to mix with the sodium sulphide solution in line 48, with suitable dilution with water, if required, to provide the desired proportion of sodium sulphide to sodium hydroxide to form a white liquor in line 78 containing sodium sulphide and sodium hydroxide, which is recycled to form at least part of the pulping liquor in line 14.

The presence of residual quantities of sodium chloride and unregenerated pulping chemicals in the recycled white liquor in line 78 usually is not disadvantageous since the sodium sulphate and other sodium- and sulphur- compound values are converted in the furnace 38 and the sodium carbonate values are cycled in the system to the causticizer 70. Any sodium chloride values in the white liquor in line 78 cycle through the system and while it is a dead load, under steady state conditions the quantity remains substantially constant since the quantity removed in the leacher 58 is approximately equal to the amount of sodium chloride introduced to the system. Therefore, while the white liquor in line 78 contains a dead load of non-active chemicals, this dead load, under steady state conditions, is substantially constant and hence does not impair the operation to any significant degree.

The pure sodium chloride which is recovered by line 58 may be put to a variety of uses. Typically, the sodium chloride is utilized to regenerate bleach plant chemicals. For example, the sodium chloride may be used to generate sodium hydroxide and chloride by electrolysis of an aqueous solution thereof, the sodium hydroxide being used in the bleach plant in line 26 and the chlorine being used in line 24. Alternatively, the sodium chloride may be used to generate chlorine dioxide and chlorine by reaction with sodium chlorate and sulphuric acid, the chlorine dioxide and chlorine being fed to the bleach plant by line 24. Further, the sodium chloride may be electrolyzed as an aqueous solution to sodium chlorate for use in a chlorine dioxide producing reaction involving reduction of the sodium chlorate in an acid medium.

Figure 2:
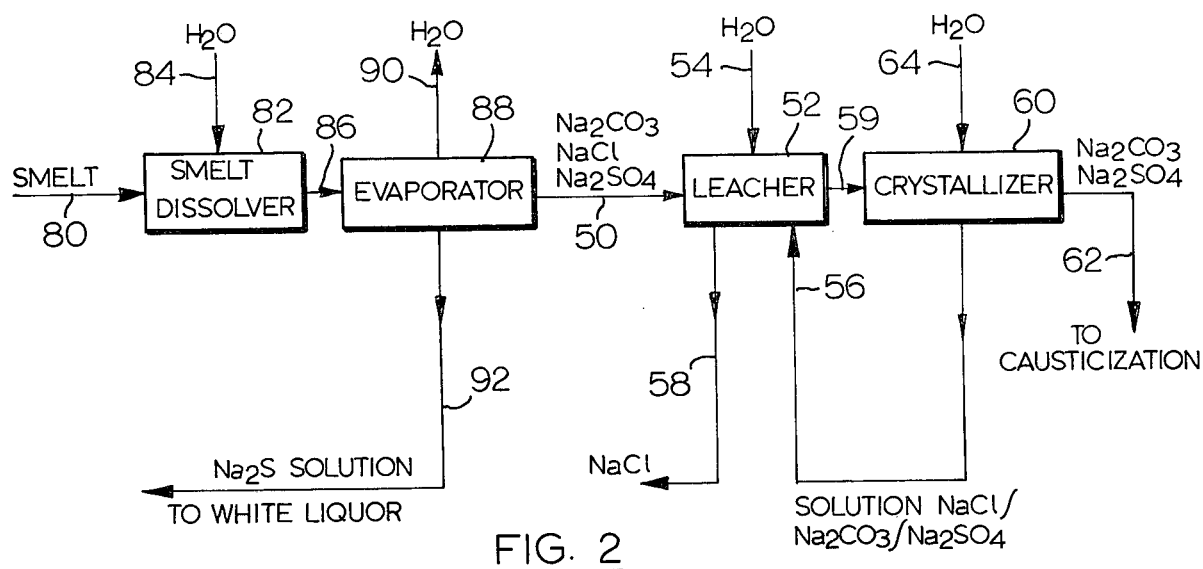
FIG. 2 is a schematic flow sheet of a modification of the embodiment of FIG. 1.

FIG. 2 illustrates a modification of the procedure of FIG. 1, in depicting an alternative smelt fractionation procedure. Features common to FIGS. 1 and 2 have been designated by the same reference numerals for ease of illustration.

In FIG. 2, a smelt in line 80 is fed to a smelt dissolver 82 wherein the smelt is dissolved in an aqueous medium fed by line 84 to form a solution of the components of the smelt. This solution is fed by line 86 to an evaporator 88 wherein the solution is boiled, the evaporated water being removed by line 90. The boiling results in deposition of a solid mixture of sodium carbonate, sodium sulphate and sodium chloride which is removed from the resulting sodium sulphide solution and is passed by line 50 to the leacher 52 for manipulation as discussed above in connection with the embodiment of FIG. 1.

The concentrated sodium sulphide solution is removed by line 92 for passage to white liquor formation, in analogous manner to that described above in connection with the sodium sulphide solution in line 48 in FIG. 1.

The boiling of the aqueous solution of the smelt components in the evaporator 88 may be carried out at a temperature of about 120°F to about 280°F, with sub- or superatmospheric pressure being used, as required. The sodium sulphide concentration of the aqueous solution of the smelt components is usually high to promote the deposition of the bulk of the sodium carbonate, sodium chloride and sodium sulphate values during the boiling step, typically about 20 to about 45%.

Figure 3:
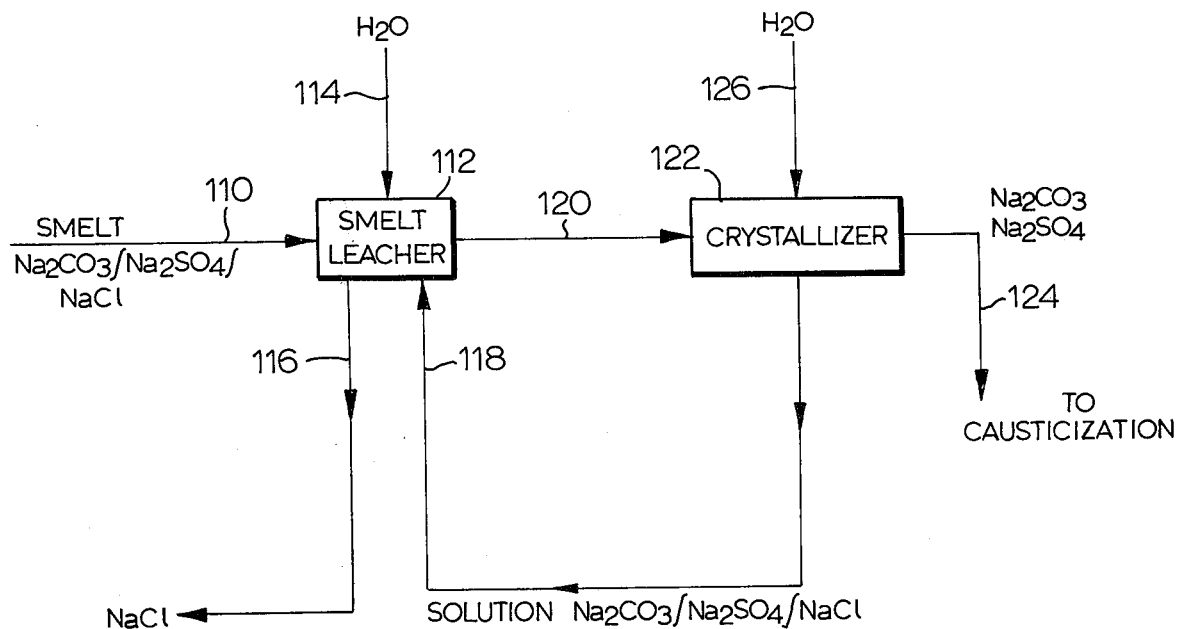
FIG. 3 is a schematic flow sheet of a second embodiment of the invention for integration with a soda mill.

Turning now to consideration of FIG. 3, there is illustrated therein a smelt manipulation procedure for use in a soda pulp mill. While the smelt manipulation procedure only is illustrated, it will be understood that the remainder of the pulp mill operation may take the form illustrated in FIG. 1, with suitable modification to take into account that sodium hydroxide is used as the sole active pulping chemical.

As illustrated in FIG. 3, a sodium carbonate-, sodium sulphate- and sodium chloride-containing smelt obtained in the recovery and regeneration operation of a soda pulp mill is fed by line 110 to a smelt leacher wherein the smelt is leached with water fed by line 114 and recycle mother liquor in line 118 to dissolve substantially all the sodium carbonate and sodium sulphate from the smelt, leaving substantially pure sodium chloride, which is recovered by line 116.

The leaching of the smelt in the leacher 112 may be carried out at approximately ambient temperatures, typically from about 55° to about 90°F, particularly about 70°F.

The aqueous solution resulting from the smelt leaching contains some recycling sodium chloride in addition to the sodium carbonate and sodium sulphate and is passed by line 120 to a crystallizer 122. In the crystallizer 122, the aqueous solution is refrigerated to cause deposition of a mixture of sodium carbonate and sodium sulphate free from sodium chloride, the deposited mixture being removed from the mother liquor by line 124.

The removed solid mixture is passed to causticization to form sodium hydroxide-containing pulping liquor for recycle to the pulping step, the causticization being carried out as described above for the solid mixture in line 62 in FIG. 1.

Water usually is added during the refrigeration step since, at the prevailing temperature, the sodium carbonate precipitates as the decahydrate, such water being added by line 126.

The refrigeration of the solution in the crystallizer 122 may be carried out to any convenient temperature, typically to a temperature below about 60°F, such as from about 32°F to about 60°F, preferably about 50°F.

The mother liquor from the crystallization of sodium carbonate and sodium sulphate is recycled by line 118 to the smelt leacher 112 for utilization therein.

In a balanced system, the quantities of sodium chloride, sodium carbonate and sodium sulphate recycling to the smelt leacher 112 in line 118 are substantially constant, so that the quantity of sodium chloride in line 116 is substantially that in the smelt in line 110 and the quantities of sodium carbonate and sodium sulphate in line 124 are substantially those in the smelt in line 110.

The present invention, as illustrated in FIGS. 1 to 3, therefore, removes sodium chloride in a pure solid and reusable form from a Kraft mill or a soda mill while all the usable chemicals are retained, thereby overcoming the prior art problem mentioned above.

EXAMPLES

The invention is illustrated by the following Examples:

EXAMPLE I

A study of the relative solubilities of the components of the system $Na_2S - NaCl - Na_2CO_3 - Na_2SO_4 - H_2O$ at various temperatures and sulphide concentrations was undertaken with a view to determining the desired conditions for smelt leaching. Small quantities of sodium hydroxide were present in the liquors. The following Table gives the results of the study:

Table

| Temperature °F | $Na_2S$ | NaOH | NaCl wt.% | $Na_2CO_3$ | $Na_2SO_4$ |
|---|---|---|---|---|---|
| 120 | 24.8 | 0.3 | 4.38 | 1.07 | 0.20 |
| 131 | 21.8 | 0.1 | 6.44 | 1.51 | 0.19 |
| 212 | 22.4 | 0.21 | 7.43 | 1.63 | 0.17 |
| 212 | 35.4 | 0.7 | 2.27 | 0.41 | 0.11 |
| 235 | 22.7 | 0.3 | 7.51 | 2.08 | 0.22 |
| 243.5 | 26.7 | 0.7 | 5.73 | 1.09 | 0.23 |
| 266.5 | 36.3 | 1.6 | 2.92 | 0.88 | 0.16 |

It will be seen from the above results that high temperatures and high sodium sulphide concentrations favour the leaching of sodium sulphide while avoiding leaching substantial quantities of other components.

EXAMPLE II

Utilizing the data of Example I and the known solubility data for the system $Na_2CO_3 - NaCl - Na_2SO_4 - H_2O$, a mass balance was calculated for the embodiment illustrated in FIG. 1 of the drawings, for an approximately 500 ton/day pulp mill.

24,908 lbs./hr. of a smelt containing 16,863 lbs. of sodium carbonate, 4,010 lbs. of sodium sulphide (35%), 3,412 lbs. of sodium chloride and 623 lbs. of sodium sulphate are leached at 100°C with 7,113 lbs./hr. of water (leacher 44) to form 11,457 lbs./hr. of an aqueous sodium sulphide solution containing 57 lbs. of sodium carbonate, 4,010 lbs. of sodium sulphide, 264 lbs. of sodium chloride, 13 lbs. of sodium sulphate and 7,113 lbs. of water, for passage to white liquor (line 48).

The 20,564 lbs./hr of a solid mixture of 16,806 lbs. of sodium carbonate, 3,148 lbs. of sodium chloride and 610 lbs. of sodium sulphate resulting from the smelt leaching are leached at 20°C with 19,283 lbs./hr. of water and 148,332 lbs./hr. of recycle solution (in line 56) containing 9,389 lbs. of sodium carbonate, 28,791 lbs. of sodium chloride, 5,281 lbs. of sodium sulphate and 104,871 lbs. of water.

Sodium chloride in an amount of 3,148 lbs./hr. remains in the solid phase and the leaching results in 185,031 lbs./hr. of leach solution containing 26,195 lbs. of sodium carbonate, 28,791 lbs. of sodium chloride, 5,891 lbs. of sodium sulphate and 124,154 lbs. of water. The leach solution is cooled to 10°C while 10,028 lbs./hr. of water are added, resulting in the crystallization of 46,727 lbs. of solids, containing 16,806 lbs. of sodium carbonate, 610 lbs. of sodium sulphate and 29,311 lbs. of water of crystallization. The solids are removed from the mother liquor and forwarded to causticization (by line 62), while the 148,332 lbs./hr. of mother liquor are recycled to the solids mixture leaching (by line 56).

EXAMPLE III

Based on the known solubility data for the system $Na_2CO_3 - NaCl - Na_2SO_4 - H_2O$, a mass balance was calculated for the embodiment illustrated in FIG. 3 of the drawings, for an approximately 500 ton/day pulp mill.

20,564 lbs/hr of a soda mill smelt containing 16,806 lbs. of sodium carbonate, 3,148 lbs. of sodium chloride and 610 lbs. of sodium sulphate are leached at 20°C with 19,283 lbs./hr of water and 148,332 lbs/hr of recycle solution (in line 118) containing 9,389 lbs. of sodium carbonate, 28,791 lbs. of sodium chloride, 5,281 lbs. of sodium sulphate and 104,871 lbs. of water.

Sodium chloride in an amount of 3,148 lbs./hr remains in the solid phase (for recovery by line 116) and 185,031 lbs./hr. of leach solution result containing 26,195 lbs. of sodium carbonate, 28,791 lbs. of sodium chloride, 5,891 lbs. of sodium sulphate and 124,154 lbs. of water. The leach solution is cooled to 10°C while 10,028 lbs./hr. of water are added, resulting in the crystallization of 46,727 lbs. of solids containing 16,806 lbs. of sodium carbonate, 610 lbs. of sodium sulphate and 29,311 lbs. of water of crystallization. The solids are removed from the mother liquor for forwarding to causticization (by line 124), while 148,332 lbs./hr. of mother liquor are recycled to the smelt leaching (by line 118).

SUMMARY

The present invention, therefore, is able to recover sodium chloride from Kraft mill and soda mill smelts containing the same without loss of other usable chemicals. Modifications are possible within the scope of the invention.

What we claim is:

1. In a pulp mill process which comprises digesting cellulosic fibrous material with a pulping liquor containing sodium hydroxide and sodium sulphide as the pulping chemicals, separating pulped material from spent pulping liquor, introducing sodium chloride to said spent pulping liquor, forming a smelt containing sodium sulphide, sodium carbonate, sodium chloride and sodium sulphate from said spent pulping liquor, fractionating said smelt to form an aqueous sodium sulphide solution and a solid mixture of sodium carbonate, sodium sulphate and sodium chloride substantially free from sodium sulphide, and recycling said aqueous sodium sulphide solution to said digestion step to provide at least part of said sodium sulphide in said pulping liquor, the improvement which comprises leaching said solid mixture with an aqueous medium to dissolve substantially completely said sodium carbonate and sodium sulphate therefrom thereby to form an aqueous sodium carbonate and sodium sulphate solution and leave substantially pure solid sodium chloride, refrigerating said aqueous sodium carbonate and sodium sulphate solution to deposit a solid mass of sodium carbonate and sodium sulphate substantially free from sodium chloride, separating said deposited solid mass from the mother liquor, forming an aqueous solution of said separated mass, converting at least a substantial proportion of the sodium carbonate in the aqueous solution of said mass to sodium hydroxide, recycling the resulting sodium hydroxide solution to said digestion step to provide at least part of said sodium hydroxide in said pulping liquor, and recycling said mother liquor to provide part of said aqueous medium leaching said solid mixture.

2. The process of claim 1 wherein said smelt fractionation is carried out by leaching said smelt with an aqueous medium to remove substantially completely said sodium sulphide therefrom thereby to form said aqueous sodium sulphide solution and leave said solid mixture of sodium carbonate, sodium sulphate and sodium chloride substantially free from sodium sulphide.

3. The process of claim 2 wherein said smelt leaching is carried out at a temperature of from about 120°F to the boiling point of the aqueous sodium sulphide solution.

4. The process of claim 3 wherein said smelt leaching is carried out with a quantity of aqueous medium to provide a sodium sulphide concentration in said aqueous sodium sulphide solution of about 20% to about 45%.

5. The process of claim 1 wherein said smelt fractionation is carried out by dissolving said smelt in an aqueous medium and boiling the resulting aqueous solution to deposit a solid mixture of sodium carbonate, sodium chloride and sodium sulphate.

6. The process of claim 5 wherein said boiling is carried out at a temperature of from about 120°F to about 280°F.

7. The process of claim 6 wherein said resulting aqueous solution has a sodium sulphide concentration of about 20 to about 45%.

8. The process of claim 1 wherein said leaching of said solid mixture is carried out at a temperature of about 55° to about 90°F.

9. The process of claim 1 wherein said refrigerating of said sodium carbonate and sodium sulphate solution is carried out to a temperature below 60°F.

10. The process of claim 9 wherein said temperature is from about 32° to about 60°F.

11. The process of claim 2 wherein said smelt leaching is carried out at a temperature of from about 120°F to the boiling point of the sodium sulphide solution, said leaching of said solid mixture is carried out at a temperature of about 55° to about 90°F and said refrigeration is carried out to a temperature of about 32° to about 60°F.

12. The process of claim 5 wherein said boiling is carried out at a temperature of from about 120°F to about 280°F, said leaching of said solid mixture is carried out at a temperature of about 55° to about 90°F and said refrigeration is carried out to a temperature of about 32° to about 60°F.

13. The process of claim 1 including adding water to said aqueous sodium carbonate and sodium sulphate solution during said refrigeration.

14. The process of claim 1 wherein said cellulosic fibrous material is wood.

15. The process of claim 14 including subjecting said pulped material to a series of bleaching and purification steps using at least one chlorine-containing bleaching chemical in at least one of said bleaching steps and aqueous sodium hydroxide-containing solutions in said purification steps, discharging a sodium chloride-containing aqueous effluent from said series of bleaching and purification steps into said spent pulping liquor whereby at least part of said sodium chloride is introduced to said spent pulping liquor.

16. The process of claim 15 including washing said pulped material after formation thereof and before passage to said series of bleaching and purification steps and utilizing said sodium chloride-containing aqueous effluent in said washing.

17. In a pulp mill process which comprises digesting cellulosic fibrous material with a pulping liquor containing sodium hydroxide as the pulping chemical, separating pulped material from spent pulping liquor, introducing sodium chloride to said spent pulping liquor and forming a smelt containing sodium carbonate, sodium chloride and sodium sulphate from said spent pulping liquor, the improvement which comprises leaching said smelt with an aqueous medium to dissolve substantially completely said sodium carbonate and sodium sulphate therefrom thereby to form an aqueous sodium carbonate and sodium sulphate solution and leave substantially pure solid sodium chloride, refrigerating said aqueous sodium carbonate and sodium sulphate solution to deposit a solid mass of sodium carbonate and sodium sulphate substantially free from sodium chloride, separating said deposited solid mass from the mother liquor, forming an aqueous solution of said separated mass, converting at least a substantial proportion of the sodium carbonate in the aqueous solution of said mass to sodium hydroxide, recycling the resulting sodium hydroxide solution to said digestion step to provide at least part of said sodium hydroxide in said pulping liquor, and recycling said mother liquor to provide part of said aqueous medium leaching said solid mixture.

18. The process of claim 17 wherein said smelt leaching is carried out at a temperature of about 55° to about 90°F.

19. The process of claim 17 wherein said refrigerating of said sodium carbonate and sodium sulphate solution is carried out to a temperature below about 60°F.

20. The process of claim 19 wherein said temperature is from about 32°F to about 60°F.

21. The process of claim 17 wherein said smelt leaching is carried out at a temperature of about 55° to about 90°F and said refrigeration is carried out to a temperature of about 32° to about 60°F.

22. The process of claim 17 including adding water to said aqueous sodium carbonate and sodium sulphate solution during said refrigeration.

23. The process of claim 17 including subjecting said pulped material to a series of bleaching and purification steps using at least one chlorine-containing bleaching chemical in at least one of said bleaching steps and aqueous sodium hydroxide-containing solutions in said purification steps, discharging a sodium chloride-containing aqueous effluent from said series of bleaching and purification steps into said spent pulping liquor whereby at least part of said sodium chloride is introduced to said spent pulping liquor.

24. The process of claim 23 including washing said pulped material after formation thereof and before passage to said series of bleaching and purification steps and utilizing said sodium chloride-containing aqueous effluent in said washing.

* * * * *